Patented Mar. 21, 1933

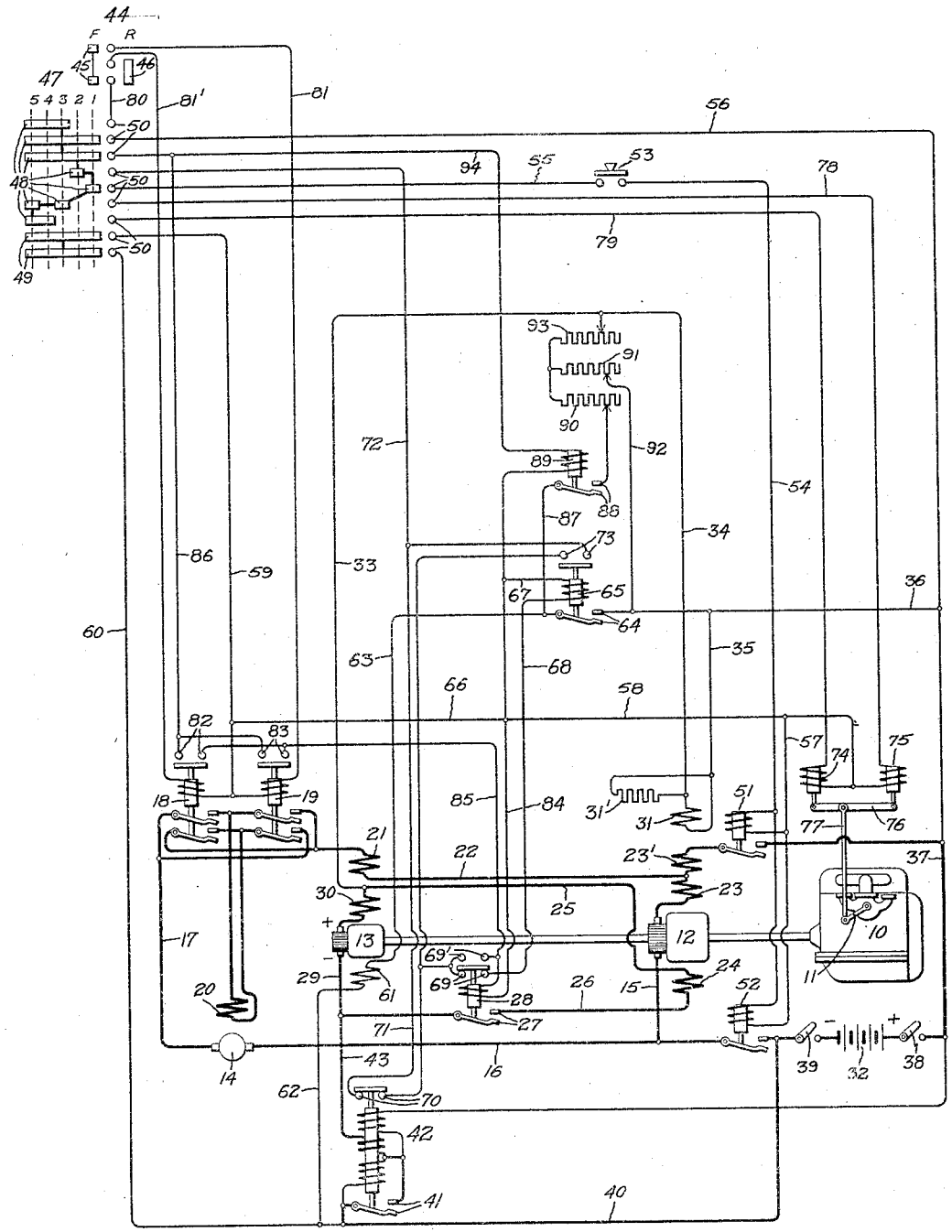

1,902,500

UNITED STATES PATENT OFFICE

MARSHALL D. HENSHAW, OF ERIE, PENNSYLVANIA, ASSIGNOR TO GENERAL ELECTRIC COMPANY, A CORPORATION OF NEW YORK

DRIVING APPARATUS FOR SELF-PROPELLED VEHICLES

Application filed April 6, 1931. Serial No. 527,958.

My invention relates to driving apparatus for self-propelled vehicles wherein an engine is arranged to drive a generator which in turn supplies current to the driving motors of the vehicle.

In apparatus of this kind maximum power output of the engine is obtained at normal speed at full throttle. For any given throttle opening the load on the engine is determined by the voltage current characteristic of the generator which supplies current to the driving motors. It has been the practice, heretofore, to provide the generator with a series differential field exciting winding, so as to give it a rapidly drooping voltage-current characteristic curve. The power output of such a generator increases over a portion of the range of load current, and then decreases quite rapidly over the remainder of the range of load current. The engine, on the other hand, supplies substantially constant power output, for any given throttle opening, so that the generator utilizes the maximum power of the engine only over a small portion of the range of operation thereof. It has been proposed to obtain satisfactory loading of the engine throughout the range of variation of load current on the generator, in apparatus of this type, by separately exciting the field excitation system of the generator throughout a portion of the range of operation thereof, and self-exciting the excitation system of the generator for the remainder of the range of operation thereof, as disclosed in Brandenstein Patent No. 1,765,298, June 17, 1930. In a system of this type in which an exciter is employed for the main generator, it is desirable to provide sufficient voltage on the exciter at idling speed of the engine to charge the battery, or operate auxiliaries. This requires considerable excitation of the exciter, and when the engine is running at normal speed, the excitation of the exciter is reduced, as required, for this increased speed to produce the desired voltage for exciting the main generator. The voltage of the exciter then becomes somewhat unsteady because of its decreased excitation below the saturation point.

An object of my invention is to provide driving apparatus for a self-propelled vehicle of this character in which the generator has an electrical characteristic effectively utilizing substantially the maximum power output of the engine throughout the range of variation of voltage and current of the generator during its operation, as disclosed in the above Brandenstein patent and, at the same time, providing somewhat simplified connections in the system, and stable operation of an exciter when employed in the system. I accomplish this by providing an engine, a generator driven by the engine, and having a field exciting winding, a battery, means for connecting the field exciting winding of the generator across the battery during operation of the engine, and an arrangement including a battery charging resistance for connecting the armature of the generator to the battery in such manner as to charge the same, and a resistance connected to a circuit between the battery charging resistance and to the field exciting winding of the generator for energizing the latter.

Further objects and advantages of my invention will become apparent in the following description referring to the accompanying drawing, and the features of novelty which characterize my invention will be pointed out with particularity in the claims annexed to and forming part of this specification.

The single figure of the drawing is a diagrammatic view of an apparatus embodying my invention.

Referring to the drawing, the apparatus which I have diagrammatically illustrated embodying my invention includes an engine 10, or other suitable prime mover, which is provided with a throttle lever 11 for controlling the same and arranged to drive a main generator 12, and an auxiliary generator or exciter 13, suitable connections being provided for connecting the main generator 12 to a series driving motor 14.

The series driving motor 14 is connected to one terminal of the main generator 12 by conductors 15 and 16, and to the other terminal thereof by conductors 17, contacts of switch 18 or 19, field exciting winding 20 of the motor, differential series field exciting winding 21 of the exciter 13, conductor 22, and commutating field exciting winding 23 of the main generator. The double contacts of switches 18 and 19 are arranged in such manner that when the switch 19 is energized and the switch 18 is deenergized, the circuit through the series field exciting winding 20 of the motor 14 is completed in such direction as to drive the vehicle in a forward direction. When the switch 18 is energized and the switch 19 is deenergized, a circuit is completed through series field exciting winding 20 of the motor in such direction as to drive the vehicle in a reverse direction.

The main generator 12 is provided with an excitation system including a separately excited field exciting winding 24, which is adapted to be connected across the armature of the exciter 13 by conductors 25, 26, contacts 27 of relay 28, conductor 29 and the commutating field exciting winding 30 of the exciter. The main generator is also provided with a field exciting winding 31, which is connected in series with the armature of the exciter 13 and a battery 32 in such relation as to charge the battery, so that the field exciting winding 31 serves as a battery charging resistance. The field exciting winding 31 is connected in series with the armature of the exciter 13 and the battery 32 by conductors 33, 34, 35, 36, 37, normally closed switches 38 and 39, conductor 40, contacts 41 of a reverse current relay 42, and conductor 43. A shunt resistance 31' is provided for the field exciting winding 31 of the main generator to limit the exciting current as desired.

The driving apparatus is controlled by manipulation of a reversing controller 44 having contacts 45 and 46, and a main controller 47 having separate interconnected groups of movable contacts 48 and 49 cooperating with fixed contacts 50. The engine is started in position 1 of the main controller by connecting the battery 32 to the main generator 12 to operate it as a series motor. In position 2 the engine is idling, and the exciter 13 charges the battery. In positions 3, 4 and 5 the driving motor 14 is connected to the main generator to run the vehicle forward or backward, depending on the position of the reversing controller 44.

In position 1 of the main controller the battery 32 is connected to the armature of the main generator 12 so as to drive the same as a series motor for starting the engine. The reversing controller is placed in the off position, or other circuit arrangements are provided, to avoid connecting the driving motor 14 to the battery. In this position of the controller, upon closing the normally open push-button 53, the relays 51 and 52 are energized by a circuit including conductors 54 and 55, movable contacts 48 of the main controller, conductors 56 and 37 to the positive side of the battery, and conductors 57, 58, 66, 59, contacts 49 of the main controller, conductors 60 and 40 to the negative side of the battery. This closes the relays 51, 52 and connects the armature of the main generator 12 across the battery 32 by a circuit including the contacts of relay 51 and 52, field exciting windings 23 and 23' of the main generator, conductor 15, and switches 38, 39 which are closed during operation of the vehicle. As soon as the engine is started the push-button 53 is released and opens, so that the relays 51, 52 open their contacts and disconnect the main generator 12 from the battery 32. The main controller 47 is then shifted to the second, or idling position.

In order to maintain the battery 32 charged it is necessary, in apparatus of this kind, to provide some arrangement for charging the battery when the engine is idling. I accomplish this by obtaining sufficient excitation of the exciter from the battery 32 at idling speed of the engine to raise its voltage high enough to close the reverse current relay 42. I obtain this degree of excitation by providing a field exciting winding 61 on the exciter, which is adapted to be connected across the battery 32 by a circuit including conductors 40, 62, 63, contacts 64 of relay 65, conductors 36 and 37, and normally closed switches 38 and 39.

It will be apparent that if the field exciting winding 61 of the exciter were energized to the extent necessary to give the desired voltage at idling speed of the engine, by closing relay 65, when the engine is running at high speed, an excessive voltage would be generated by the exciter. This might occur, for example, if the operator suddenly shifted the main controller from a power position in which the engine throttle would be opened and the engine running at full speed to the idling position 2 of the controller. The reverse current relay 42 would then be closed and contacts 70 thereof open. In accordance with my invention I prevent closing of the relay 65 until the engine is running at idling speed, by interlocking the relay 65 with the reverse current relay 42 in such manner that it cannot be energized until the engine speed and corresponding exciter voltage is low enough to cause opening of the reverse current relay. It will be noted that, when the main controller 47 is in the idling position 2 and the reverse current relay 42 is open, the circuit between the battery 32 and the relay 65 is completed through contacts 70 of reverse current relay 42, conductors 40, 60, contacts 49 of the main controller, conductors 59, 66, 67, to one side of the operating coil 65 and from the other side thereof by conductors 68, contacts 69 of relay 28, contacts 70 of reverse current relay 42, conductors 71 and 72, contacts 48 of the main controller, conductors 56 and 37 to the other side of the battery. By this circuit arrangement the relay 65 cannot be energized to apply the excitation required in the exciter to produce the desired charging voltage of the battery at idling speed of the engine, until the speed thereof has decreased sufficiently to open contacts 41 of the reverse current relay 42, and close the interlocking contacts 70 thereof. When, however, the engine slows down to idling speed and the reverse current relay 42 opens and closes the contacts 70 to energize the relay 65, the field exciting winding 61 of the exciter 13 will then be energized so as to raise the voltage of the exciter sufficiently to close the reverse current relay 42 and charge the battery 32. Closing the reverse current relay 42 opens the contacts 70. This would de-energize the relay 65, but contacts 73 are provided on the relay 65 which are closed when the contacts 64 thereof are closed, so that upon closing the reverse current relay and opening the contact 70 thereof, the circuit from the battery through the operating coil 65 of the relay will be completed through the contacts 73 thereof instead of through the contacts 70 of the reverse current relay.

The vehicle operator may also shift the main controller from a power position to idling position when the reverse current relay 42 is open, and the engine may be running at such speed that application of full excitation to the field exciting winding 61, obtained by closing relay 65, may produce an excessive voltage. The reverse current relay may be opened, for example, when the vehicle is running slowly and the driving motor requires heavy current. This is due to the fact that the differential series field exciting winding 21 of the exciter 13 will thus reduce the voltage thereof sufficiently to open the reverse current relay 42. In order to prevent closing of the relay 65 upon shifting of the main controller 47 from a power position to idling position, when reverse current relay 42 is opened in this way, I provide contacts 69' on relay 28 arranged to energize the operating coil of the relay 28 from the battery 32 by a circuit including conductors 40, 60, contacts 49 of the main controller 47, conductors 59, 66 and 84 to one side of the operating coil, and from the other side thereof through contacts 69' (which will under these conditions be bridged by the closed relay 28), contacts 70 of the reverse current relay, conductors 71 and 72, contacts 48 of the main controller 47, and conductors 56 and 37 to the other side of the battery. Moving the controller to the idling position will open the circuit to the relay 18 or 19 connecting the driving motor to the armature of the main generator 12, so as to deenergize the differential series field exciting winding 21 of the exciter. The exciter voltage will shortly build up at idling speed of the engine sufficiently to close the reverse current relay 42. This will open the contacts 70, de-energize the operating coil of relay 28, and bridge the contacts 69. The relay 65 is thus energized, by circuits previously explained, to close the contacts 64 thereof, so as to excite the field exciting winding 61 of the exciter from the battery, and produce the desired exciter voltage at idling speed of the engine for charging the battery.

When it is desired to operate the vehicle in a forward or a reverse direction, the reversing controller 44 is placed in the forward or reverse position and the main controller 47 is shifted to positions 3, 4 and 5. Upon shifting the main controller 47 into positions 3, 4, or 5, the throttle 11 of the engine 10 is opened in three successive steps by the operation of throttle operating relays 74 and 75, the movable elements of which are interconnected by a link 76. The link 76 is connected to the throttle lever 11 by a link 77, which is connected to the link 76 nearer the relay 74 than the relay 75, so that upon energizing the relay 74 the engine throttle will be opened somewhat wider than when the relay 75 is energized. When both relays 74 and 75 are energized the throttle is further and fully opened. In position 3 of the controller the relay 75 is first energized from the battery of a circuit including conductors 37, 56, contacts 48 of the main controller, conductors 78 to one side of the operating coil of relay 75, and from the other side thereof to the battery by conductors 58, 66, 59, contacts 49 of the main controller, and conductors 60 and 40 to the other side of the battery. This opens the throttle 11 in its first step to increase the speed of the engine. In position 4 of the controller the relay 75 is deenergized and the relay 74 is energized from the battery 32, to further open the engine throttle, by a circuit including conductors 37, 56, and contacts 48 of the main controller, conductor 79 to one side of the operating coil of relay 74, and from the other side thereof by conductors 58, 66, 59, contacts 49 of the main controller, and conductors 60 and 40 to the other side of the battery. The relay 74 opens the engine throttle somewhat wider than the relay 75 because the link 77 is connected to the link 76 nearer to the relay 74 than to the relay 75. In position 5 of the main controller 47 both of the relays 74 and 75 are energized from the battery 32 to fully open the engine throttle by a circuit including conductors 40, 60, contacts 49 of the main controller, conductors 59, 66, 58, to one side of the operating coils of relays 74 and 75, and from the other side thereof through conductors 78, 79, the contacts 48 of the main controller, and conductors 56, 37 to the other side of the battery. It will thus be seen that the operation of the main controller 47 to the power positions 3, 4 and 5 opens the throttle of the engine 10 in three successive steps.

When the main controller 47 is shifted to the power positions 3, 4 and 5 thereof, it is desirable that the circuit between the exciter 13 and the field exciting winding 24 of the main generator should not be closed until after the driving motor 14 is connected to the armature of the main generator 12. In accordance with my invention, therefore, I energize relay 18 or 19, depending upon whether it is desired to drive the vehicle forward or backward, from the battery by a circuit including conductors 37 and 56, contacts 48 of the main controller, conductor 80 connecting the upper stationary contact of the main controller to the lower stationary contact of the reversing controller, contact 45 or 46 of the reversing controller, conductor 81 or 81', to one side of the operating coil of the relay 18 or 19, and from the other side thereof by conductor 59, contacts 49 of the main controller and conductors 60 and 40 to the other side of the battery. This closes relay 18 or 19 so as to connect the field exciting winding 20 of the driving motor to the main generator, and also closes contacts 82 of the relay 18 or contacts 83 of the relay 19. Upon closing either of the contacts 82 or 83 the operating coil of the relay 28 is connected to one side of the battery by conductors 40, 60, contacts 49 of the main controller, conductors 59, 66 and 84 to one side of the operating coil of the relay 28, and to the other side thereof by conductors 85, contacts 82 or 83 of the relays 18 or 19, conductor 86, contacts 48 of the main controller, and conductors 56 and 37. In this way the relay 28 is not energized to connect the field exciting winding 24 to the armature of the exciter 13 until after the relays 18 or 19 are energized to connect the driving motor 14 of the vehicle to the armature of the main generator 12.

In order to obtain a voltage current characteristic curve on the main generator 12 of such form that it will effectively utilize substantially the entire power output of the engine throughout the range of variation of voltage and current of the main generator, I control the excitation of the field exciting winding 61 of the exciter 13 in such manner that the main generator 12 has a voltage current characteristic curve which does not vary to any large extent as the load current varies throughout the heavy load current portion of the characteristic curve, and then is of such form that the voltage increases rapidly with decrease in load current over the low load current portion of the characteristic curve.

When the vehicle is started, or pulling a heavy load, the differential series field exciting winding 21 of the exciter 13 will decrease the voltage of the exciter, so that it is below that of the battery 32, and the contacts 41 of the reverse current relay 42 will be opened. Under this condition of load the generator should have a separately excited type of characteristic curve. In accordance with my invention, I obtain this form of characteristic by connecting one terminal of the field exciting winding 61 of the exciter to the battery 32 by a circuit including a normally closed switch 39, conductors 40, 62, and the other terminal thereof by conductors 63, 87, contacts 88 of relay 89, which are closed in all of the operating positions of the main controller, adjustable resistances 90 and 91, and conductors 92, 36 and 37 to the other side of the battery. This provides separate excitation for the exciter 13, and thereby energizes the field exciting winding 24 of the main generator in such manner that the voltage thereof varies only slightly with variations in load current, which is the desired form of characteristic curve for the main generator over the heavy load portion of the voltage current characteristic curve. As the load on the main generator decreases the load current flowing through the differential series field exciting winding 21 will also decrease, so that the voltage of the exciter 13 will rise to a value slightly above the battery 32, so as to cause the reverse current relay 42 to close the contacts 41 thereof. This will charge the battery through a circuit including conductors 33, 34, field exciting winding 31 of the main generator 12, which will serve as a battery charging resistance, conductors 35, 36, 37 to one side of the battery, and from the other terminal of the exciter by conductors 29, 43, contacts 41 of the reverse current relay 42 and conductor 40 to the other side of the battery. At the same time the increased voltage of the exciter 13 is applied to the field exciting winding 61 of the exciter by a circuit including conductors 33, variable resistances 93, 90, contacts 8 of relay 89, conductors 87 and 63, to the other side of the field exciting winding 61. The resistances 91 and 93 are so proportioned that when the voltage of the exciter 13 is less than the battery 32, there is a negligible flow of current from the battery through the resistance 93 and the circuit including the armature of the exciter. On the other hand, when the voltage of the exciter 13 increases above that of the battery 32 then the reverse current relay 42 closes the contacts 41 thereof. Current then flows from the armature of the exciter 13 to the field exciting winding 61 thereof through the resistances 93 and 90, and from the connection 92 from the circuit between the field exciting winding 31 of the main generator, which serves as the charging resistance for the battery 32, through resistances 91 and 90. In this way current is supplied from these two sources through the resistances 90, 91 and 92, so that the field exciting winding 61 of the exciter 13 is excited so as to produce the voltage current characteristic curve of the main generator 12, such that the voltage thereof increases rapidly with a decrease in load current. It will thus be seen that opening and closing the reverse current relay 42, upon changes of the relation of the voltage of the exciter 13 to the voltage of the battery 32 changes the form of the characteristic curve of the main generator from the form of that of a separately excited generator to that of a self-excited generator, and this change is dependent upon the influence of the load current on the main generator flowing therefrom to the driving motor 14 through the differential series field winding 21 of the exciter 13. The characteristic curve on the main generator for all conditions of load will, therefore, correspond quite closely to the generator characteristic curve required for constant load on the engine under all conditions, which is in the form of an equilateral hyperbola.

I have found that arranging the field exciting winding 61 so that it is excited from the armature of the exciter 13 through resistances 93 and 90, and also from the connection between the field exciting winding 31 of the main generator and the battery 32, produces considerably increased stability of operation of the exciter 13, so that it is not as sensitive, as in systems of this type heretofore proposed, to changes in operating conditions and variations in speed of the engine.

In the operation of the apparatus which I have described, the reverse controller 44 is first placed in its off-position as shown in the drawing, and the main controller 47 is moved to starting position 1 thereof so that upon closing the push-button 53 the battery 32 is connected across the main generator 12 so as to operate the same as a series motor for starting the engine. When the engine is started the push-button 53 is released, which opens the contacts of relays 51 and 52 and disconnects the battery from the main generator. The main controller 47 is then shifted to the idling position 2 thereof, in which position field exciting winding 61 of the exciter is excited directly from the battery 32, so as to obtain sufficient voltage at idling speed of the engine to charge the battery 32. The reversing controller 44 is then shifted to the forward or reverse position, and the main controller 47 is shifted in three successive steps to the power positions 3, 4 and 5, which opens the throttle of the engine 10 so as to increase its speed. In position 3 of the main controller the relay 19 is energized to connect the motor 14 to the armature of the main generator 12 through the differential series field exciting winding 21 of the exciter 13, and the relay 19 remains closed in all the power positions 3, 4 and 5. If the vehicle is being started, the load current supplied by the main generator to the driving motor 14 will be quite heavy, and this will energize the differential series field exciting winding 21 of the exciter 13 so as to decrease the voltage thereof below the value required for charging the battery 32, and the contacts 41 of the reverse current relay 42 will be opened. The field exciting winding 61 of the exciter will then be energized almost entirely from the battery 32 through the circuits including resistances 90 and 91, and the voltage characteristic curve of the main generator will be of the separately excited type so that the heavy current required in starting the vehicle can be supplied without overloading the engine. As the speed of the vehicle increases the load current required by motor 14 will decrease, and the energization of the differential series field exciting winding 21 of the exciter 13 will be decreased, so that the voltage of the exciter will increase above that of the battery 32. When this occurs contacts 41 of the reverse current relay 42 will be closed and the field exciting winding 61 of the exciter will be energized from the armature of the exciter 13 through the resistances 93 and 90 and from the connection between the field exciting winding 31 of the main generator and the battery through the resistances 91 and 90, so that the voltage current characteristic curve of the main generator 12 will, under these conditions, be of the self-excited type and the voltage of the generator will increase rapidly with decrease in load current.

In view of the foregoing it will be understood that I have provided a driving apparatus for a self-propelled vehicle in which the desired form of voltage current characteristic curve of the main generator is obtained with very stable operation of the exciter 13 under all conditions.

Modifications of the circuit arrangements which I have described as employed in my improved apparatus will appear to those skilled in the art. I desire it to be understood, therefore, that my invention is not to be limited to the particular construction set forth, and I intend in the appended claims to cover all modifications which do not depart from the spirit and scope of my invention.

What I claim as new and desire to secure by Letters Patent of the United States is:

1. A vehicle driving apparatus including a prime mover, a generator driven by said prime mover and having a field exciting winding, a battery, means for connecting the field exciting winding of said generator across said battery during operation of the vehicle, means including a battery charging resistance for connecting the armature of said generator to said battery in such relation as to charge the same, and means including a resistance connected across said battery charging resistance and to the field exciting winding of said generator for energizing the latter.

2. A vehicle driving apparatus including a prime mover, a generator having a field exciting winding, a battery, means for connecting the field exciting winding of said generator across said battery during operation of the vehicle, means including a field exciting winding serving as a battery charging resistance for connecting the armature of said generator to said battery in such relation as to charge the same, and means including a resistance connected across the field exciting winding serving as a battery charging resistance and to the field exciting winding of said generator for energizing the latter.

3. A vehicle driving apparatus including a prime mover, a main generator driven by said prime mover and having a field exciting winding, an auxiliary generator having a field exciting winding, a battery, means for connecting the field exciting winding of said auxiliary generator across said battery during operation of the vehicle, means for connecting the armature of said auxiliary generator in series with the field exciting winding of said main generator and said battery in such relation as to charge said battery, and means including a balancing resistance connecting a terminal of the field exciting winding of said auxiliary generator to a terminal of the armature of said auxiliary generator and to a circuit between said battery and the field exciting winding of said main generator for supplying part of the energy required by the field exciting winding of said auxiliary generator.

4. A vehicle driving apparatus including a prime mover, a main generator driven by said prime mover and having a field exciting winding, an auxiliary generator having a field exciting winding, a battery, means for connecting the field exciting winding of said auxiliary generator across said battery during operation of the vehicle, means for connecting the armature of said auxiliary generator in series with the field exciting winding of said main generator and said battery in such relation as to charge said battery, and means responsive to an electrical characteristic of said auxiliary generator and including a balancing resistance connecting a terminal of the field exciting winding of said auxiliary generator to a terminal of the armature of said auxiliary generator and to a circuit between said battery and the field exciting winding of said main generator for applying part of the energy required by the field exciting winding of said auxiliary generator.

5. A vehicle driving apparatus including a prime mover, a main generator driven by said prime mover and having a field exciting winding, an auxiliary generator having a field exciting winding, a battery, means for connecting the field exciting winding of said auxiliary generator across said battery during operation of the vehicle, means for connecting the armature of said auxiliary generator in series with the field exciting winding of said main generator and said battery in such relation as to charge said battery, and means responsive to a voltage of said auxiliary generator slightly greater than said battery at a predetermined speed of said prime mover and including a balancing resistance connecting a terminal of the field exciting winding of said auxiliary generator to a terminal of the armature of said auxiliary generator and to a circuit between said battery and the field exciting winding of said main generator for supplying part of the energy required by the field exciting winding of said auxiliary generator.

6. A vehicle driving apparatus including a prime mover, a main generator driven by said prime mover and having a field exciting winding, an auxiliary generator having a field exciting winding, a battery, means for connecting the field exciting winding of said auxiliary generator across said battery during operation of the vehicle, means for connecting the armature of said auxiliary generator and said battery in such relation as to charge said battery, a resistance connecting a terminal of the field exciting winding of said auxiliary generator to a circuit between said battery and the field exciting winding of said main generator, and a resistance connecting an intermediate portion of the resistance connecting the exciter field to said circuit to a circuit between the armature of said auxiliary generator and the field exciting winding of said main generator.

7. A vehicle driving apparatus including a prime mover, a generator driven by said prime mover and having a field excitation system, a battery, means for connecting said battery to said generator to charge the same, means for increasing the excitation of said generator at idling speed of said prime mover to charge said battery, and means responsive to actuation of said first-mentioned means for preventing increase in excitation of said generator until said prime mover is running at idling speed.

8. A vehicle driving apparatus including a prime mover, a generator driven by said prime mover and having an excitation system, a battery, means including a reverse current relay for connecting said battery to said generator to charge the same, means for increasing the excitation of said generator at idling speed of said prime mover, and means responsive to actuation of said reverse current relay for preventing increase in excitation of said generator until said prime mover is running at idling speed.

9. A vehicle driving apparatus including a prime mover, a generator driven by said prime mover and having an excitation system, a battery, means including said battery for obtaining a separately excited voltage-current characteristic from said generator, and means including a reverse current relay for charging said battery from said generator, and means controlled by said reverse current relay for obtaining a self-excited voltage-current characteristic from said generator.

10. A vehicle driving apparatus including a prime mover, a main generator driven by said prime mover and having an excitation system, driving motors for the vehicle, means for connecting said driving motors to said main generator, a battery, an auxiliary generator, means for connecting said auxiliary generator to the excitation system of said main generator, means for connecting said auxiliary generator to said battery to charge the same, means for increasing the voltage of said auxiliary generator until said prime mover is operating at idling speed, and means for preventing an increase in the voltage of said auxiliary generator until said prime mover is operating at idling speed.

11. A vehicle driving apparatus including a prime mover, a main generator driven by said prime mover and having an excitation system, driving motors for the vehicle, means for connecting said driving motors to said main generator, a battery, an auxiliary generator, means for connecting said auxiliary generator to the excitation system of said main generator, means for connecting said auxiliary generator to said battery to charge the same, means for increasing the voltage of said auxiliary generator when said prime mover is operating at idling speed, and means controlled by said means for connecting said auxiliary generator to the excitation system of said main generator for preventing an increase in the voltage of said auxiliary generator until said prime mover is operating at idling speed.

12. A vehicle driving apparatus including a prime mover, a main generator driven by said prime mover and having an excitation system, driving motors for the vehicle, means for connecting said driving motors to said main generator, a battery, an auxiliary generator, means for connecting said auxiliary generator to the excitation system of said main generator, means including a reverse current relay for connecting said auxiliary generator to said battery to charge the same, means for increasing the voltage of said auxiliary generator when said prime mover is operating at idling speed, and means controlled by said reverse current relay and said means for connecting said auxiliary generator to the excitation system of said main generator for preventing an increase in the voltage of said auxiliary generator until said prime mover is operating at idling speed.

In witness whereof, I have hereunto set my hand.

MARSHALL D. HENSHAW.